May 23, 1950  R. TANBERG  2,508,629
METHOD OF FEEDING RAW MATERIALS TO SMELTING FURNACES
Filed Sept. 13, 1946
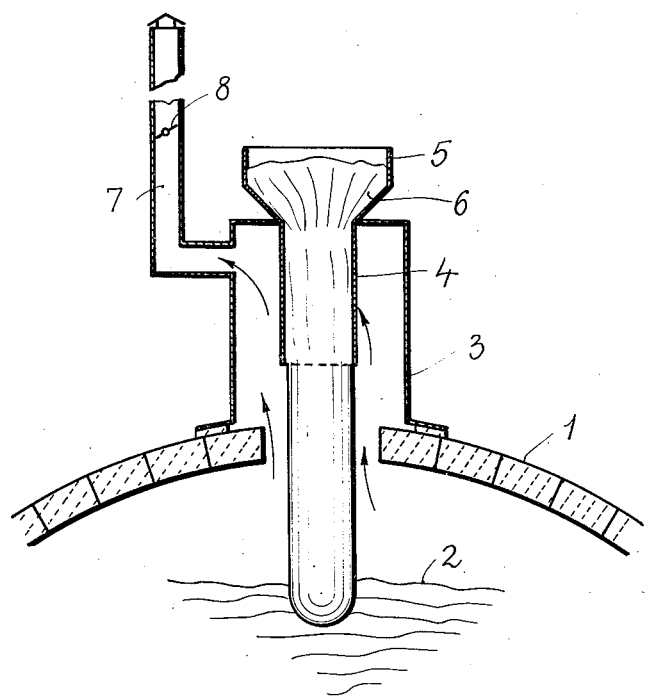
INVENTOR.
RAGNAR TANBERG
BY Francis J. Klempay
ATTORNEY.

Patented May 23, 1950

2,508,629

UNITED STATES PATENT OFFICE 2,508,629

METHOD OF FEEDING RAW MATERIALS TO SMELTING FURNACES

Ragnar Tanberg, Drammen, Norway

Application September 13, 1946, Serial No. 696,842
In Norway May 13, 1943

Section 1, Public Law 690, August 8, 1946
Patent expires May 13, 1963

3 Claims. (Cl. 49—77)

The invention relates to a method of the continuous feeding of raw materials to smelting furnaces. The invention is particularly useful in connection with continuous feeding of raw materials for producing glass, but it might also be used for feeding of furnaces of other kinds.

In such furnaces difficulties have occurred in that the usually powdery charging material used, during the feeding of the smelting furnace, dusts heavily and this dust settles on the roof and remaining interior surfaces. This development of dust has furthermore a detrimental effect in that the dust enters the openings of the burners and therefrom the regenerative chambers, which thereby are damaged. Another disadvantage of charging powdery materials in the prior manner is that these are easily spread over the surface of the smelting bath and thereby contact the fire-resisting lining, which is heavily corroded through the content of the fluxing materials like sodium carbonate, for example.

In the German Patent No. 151,657, there is proposed a method for smelting of glass, where the charge is fed to the smelting furnace by arranging in a special device located on the side of or above the smelting furnace pressing-rolls and heated guiding-rolls, which transform the charge, eventually with the addition of a binding means to a continuous belt or a bar, which then is introduced into the smelting furnace. No notice has been paid to above mentioned difficulties, because the object in this prior process is to avoid congestion of the charge in front of the electric-arc electrodes.

By the method of the present invention the difficulties mentioned in the introduction are avoided and at the same time other advantages are also obtained.

By the present method the powdery charge to which is added a binding means is cemented through heating to such an extent, that it might be introduced down into the fusion in the shape of a continuous bar, and this is so performed that the charge with the binding means added is conveyed to the fusion through a tube or guiding mantle arranged in or above an opening in the roof of the furnace, which tube is heated by heat from the furnace to such an extent, that the charge without being enveloped continuously might be fed down into the fusion with a speed corresponding with the smelting of the charge, respectively the reaction of contacting the smelted mass. During the passing of the charge through the tube the cementing will increase gradually so that the charge, when reaching the outlet of the tube, has acquired a sufficient consistency to be fed down into the fusion. The charge will thus be much more rapidly heated to the temperature of smelting than by being placed on the surface of the fusion, and the charge will not be spread over the surface and will consequently not contact the lining of the furnace.

As a binding means for the charge I have found that I may advantageously use evaporated waste sulphite lye from the cellulose industry or other aqueous solutions of saccharides, tannic acids, resins and substances of exothermic carbonization like lignine and derivatives of lignine of substantially the same composition as waste sulphite lye. Preferably the waste sulphite lye contains about 50-60% of solids. Substances of this kind will bind the mass together without making it stick to the enclosing iron-mantle, because it shrinks and gets stiff by drying slightly and because the coking is starting at moderately low temperatures and thereafter continues exothermically.

It has been proved that by using waste sulphite lye as binding means in such small quantities that the mass does not stick noticeably to the shaping iron cylinder so great a binding power is attained by a following slight drying at low temperatures, that the mass might be pushed out of the shaping tube and be sufficiently mechanically strong to form a separate body for introduction into the smelting bath without support from the shaping cylinder.

It is further proved that during the above mentioned drying of the mass, the mass is completely separated from the iron cylinder, so that the completely dried and shaped bar is easily moved out of the shaping tube.

It has also been proved that the quantity of sulphite lye to be added for obtaining a sufficient binding capacity might suitably be fixed at between 10 and 35% and that the following drying might suitably be done at a temperature of about 150° C.–300° C.

By the term waste sulphite lye which is used above and in the claims is to be understood waste lye from the production of cellulose of sulphite regardless of whether the production process is the usual sulphite-process, which is working with calcium-bi-sulphite, or other sulphite-processes, for example those using ammonium-bi-sulphite.

A solution according to the invention might also be produced by mixing its separate components for example a solution produced by mixing and heating to 80–90° C. of:

| | Per cent |
|---|---|
| Glucose | 5–10 |
| Tannine | 12–21 |
| Natural resins | 4–8 |
| Ligno-sulfo-acid-calcium (finely distributed or dispersed lingine) | 17–28 |
| Water | 40–60 |

The mass which has been mixed and stamped down in the shaping tube and dried as above mentioned has the quality of being coked relatively easily at moderate temperatures, a temperature of about 250° C. initiating a coking process which develops exo-thermically, whereby coking is easily obtained.

As will be understood the invention will preferably be used in connection with a stationary tube or mantle arranged above the bath which forms an electrode and in which the mass being charged is through heat effect compacted to enable the mass to be conveyed down into the furnace as it is consumed.

In one embodiment of the invention a jacket of heat resisting material is arranged around the shape forming tube or mantle through which the hot gases from the smelting bath are conducted in such a way that the tube and thereby the mass is heated to some hundred degrees, whereby the mass passing through the tube is stiffened and hardened, thus forming a compact, consistent mass. In the accompanying drawing the embodiment is shown quite diagrammatically: 1 is the roof of the furnace, 2 the surface of the bath and 3 the jacket of heat resisting material arranged on the roof of the furnace. In the upper, closed end of this jacket is placed the shape forming tube 4, which at its top is provided with a funnel-shaped extension 5, in which the mass, consisting of a mixture prepared beforehand of for instance 90% of the charge and about 10% of concentrated waste sulphite lye is deposited. The hot gases from the furnace pass through the jacket 3 and out through an outlet-pipe 7, provided with a regulating damper 8. Through the action of the heat from the gas the mass will at first be stiffened and thereafter be coked to a compact bar.

As will be understood it will be necessary when starting the process or after an eventual stop in feeding the materials to take special precautions until a compact mass has been formed, which might continuously be conveyed down into the fusion.

To solve this difficulty the procedure according to the invention consists in introducing into the empty tube from its top a plate, which approximately fills the tube, by means of a rod or string. The plate is lowered so as to close the opening of the tube, whereupon the pre-heated and partly slaggy charge is filled into the tube. When the charge has become sufficiently compact, the plate is pushed or lowered into the bath. The plate might for instance consist of fire-proof material, which will float on the fusion. It might later be removed on a suitable occasion.

The shape-forming tube is in the drawing shown firmly connected with the roof. The fire-proof tube might, however, also be arranged in connection with furnaces which are not provided with roof, the tube being secured above the surface of the bath by means of various kinds of arrangements.

The invention is above described particularly in connection with its use for production of glass. It might however be used with advantage in other processes, where the question is of feeding a charge to a fusion, for instance in various metallurgical processes.

I claim:
1. The method of charging pulverulent raw materials into a smelting furnace which consists of mixing the charging materials with waste sulphite lye having a solid content of 50 to 60 per cent, introducing a continuous mass of the mixture into the furnace in a vertically downward direction, and constraining the outer surface of said mass against outward movement for a substantial vertical extent above the surface of the bath in the furnace to thereby continuously form a self-supporting bar of the charging materials, which bar has its lower end supported on the surface of the bath and has a rate of downward movement determined by the rate of melting of its lower end.

2. The method of charging pulverulent raw materials into a smelting furnace which consists of mixing the charging materials with a suitable binding agent, introducing a continuous mass of the mixture into the furnace in a vertically downward direction, heating said downwardly moving mass to a temperature of from 150° to 300° C. whereby said mixture is at least partially coked, and constraining the outer surface of said mass against outward movement for a substantial vertical extent above the surface of the bath in the furnace to thereby continuously form a self-supporting bar of the charging materials, which bar has its lower end supported on the surface of the bath and has a rate of downward movement determined by the rate of melting of its lower end.

3. The method of claim 1 further characterized in that said waste sulphite lye constitutes between 10% and 35% of the mass of the agglomerate charged into the furnace.

RAGNAR TANBERG.

REFERENCES CITED

The following references are of record in the file of this patent:

UNITED STATES PATENTS

| Number | Name | Date |
|---|---|---|
| 708,309 | Brown | Sept. 2, 1902 |
| 1,421,211 | Good | June 27, 1922 |
| 1,874,799 | Peiler | Aug. 30, 1932 |
| 2,122,241 | Arnold | June 28, 1938 |